(12) United States Patent
Wangerow et al.

(10) Patent No.: US 8,173,082 B1
(45) Date of Patent: May 8, 2012

(54) JP-8 FUEL PROCESSOR SYSTEM

(75) Inventors: James Wangerow, Medinah, IL (US); Andy Hill, Glen Ellyn, IL (US); Chakravarthy Sishtla, Woodridge, IL (US); Michael Onischak, St. Charles, IL (US)

(73) Assignee: Gas Technology Institute, Des Plaines, IL (US)

( * ) Notice: Subject to any disclaimer, the term of this patent is extended or adjusted under 35 U.S.C. 154(b) by 1394 days.

(21) Appl. No.: 11/803,370

(22) Filed: May 14, 2007

(51) Int. Cl.
*C10K 3/06* (2006.01)
*B01J 8/00* (2006.01)

(52) U.S. Cl. ........ 422/600; 422/629; 422/631; 422/212; 422/216; 48/213; 48/215; 48/214 R; 48/214 A

(58) Field of Classification Search ............... 422/629, 422/631, 639, 646, 212, 216; 48/214 R, 48/215, 213, 197 R, 214 A; 423/665
See application file for complete search history.

(56) References Cited

U.S. PATENT DOCUMENTS

| | | | |
|---|---|---|---|
| 3,771,261 A * | 11/1973 | Mandelik et al. | 48/214 A |
| 3,901,667 A * | 8/1975 | Herrmann | 48/214 A |
| 3,973,923 A * | 8/1976 | Staege et al. | 48/197 R |
| 4,017,274 A * | 4/1977 | Galstaun | 48/214 A |
| 4,217,295 A * | 8/1980 | Friedrich et al. | 502/84 |
| 4,943,494 A | 7/1990 | Riley | |
| 5,079,103 A | 1/1992 | Schramm | |
| 5,366,819 A | 11/1994 | Hartvigsen et al. | |
| 5,612,149 A | 3/1997 | Hartvigsen et al. | |
| 5,686,196 A | 11/1997 | Singh et al. | |
| 5,763,114 A | 6/1998 | Khandkar et al. | |
| 5,906,898 A | 5/1999 | Pondo | |
| 5,908,800 A * | 6/1999 | Bonneau et al. | 501/103 |
| 6,485,852 B1 | 11/2002 | Miller et al. | |
| 6,502,533 B1 | 1/2003 | Meacham | |
| 6,608,463 B1 | 8/2003 | Kelly et al. | |
| 6,653,005 B1 | 11/2003 | Muradov | |
| 6,749,958 B2 | 6/2004 | Pastula et al. | |
| 6,921,596 B2 | 7/2005 | Kelly et al. | |
| 7,097,925 B2 | 8/2006 | Keefer | |
| 7,108,932 B2 | 9/2006 | Iwasaki et al. | |
| 7,132,184 B2 | 11/2006 | Ogino et al. | |
| 7,169,495 B2 | 1/2007 | Pastula et al. | |
| 2006/0263284 A1 * | 11/2006 | Larcher et al. | 423/213.2 |

FOREIGN PATENT DOCUMENTS

WO    WO 03/098728 A1    11/2003

* cited by examiner

*Primary Examiner* — Nina Bhat
(74) *Attorney, Agent, or Firm* — Mark E. Fejer

(57) ABSTRACT

A fuel processing system for heavier sulfur-laden hydrocarbon fuels, such as JP-8 and diesel fuels, having a fuel processor in which the sulfur-laden hydrocarbon fuels are reformed using steam reforming, an integrated desulfurization/methanation unit, and a solid oxide fuel cell. The heart of the system is the desulfurization/methanation unit which has a first reactor vessel and a second reactor vessel disposed within the first reactor vessel, forming an enclosed reaction space between the first reactor vessel and the second reactor vessel. A methanation catalyst is provided in the enclosed reaction space or the second reactor vessel. A desulfurization material is provided in the other of the enclosed reaction space and the second reactor vessel. During the normal course of operation, the desulfurization material will reach a saturation point at which it is no longer able to adsorb the sulfur-containing compounds. Contrary to conventional systems in which a fuel containing sulfur is desulfurized prior to methanation in two separate desulfurizer and methanation vessels and the spent desulfurization material is regenerated, the first and second reactor vessels of this invention are separable such that the reactor vessel containing the spent desulfurization material simply can be removed and replaced with a reactor vessel containing fresh desulfurization material.

13 Claims, 3 Drawing Sheets

JP-8 FUEL PROCESSOR SYSTEM

The U.S. Government has a paid-up license in this invention and the right in limited circumstances to require the patent owner to license others on reasonable terms as provided for by the terms of Contract No. W9132T-04-C-0015 awarded by the Army Corps of Engineers, U.S. Department of Defense.

BACKGROUND OF THE INVENTION

1. Field of the Invention

This invention relates to the conversion of sulfur-laden hydrocarbon fuels to product gas containing hydrogen, carbon monoxide, and trace amounts of hydrocarbons that is suitable for use in solid oxide fuel cells. In one aspect, this invention relates to a fuel processor system for converting sulfur-laden hydrocarbon fuels to fuels suitable for use in fuel cells. More particularly, this invention relates to a fuel processor system for converting heavier, sulfur-laden hydrocarbon fuels, such as JP-8 and diesel fuels, to fuels suitable for use in high temperature fuel cells, such as solid oxide fuel cells.

2. Description of Related Art

Fuel cells are electrochemical devices that convert the chemical energy of a fuel into electrical energy with high efficiency. The basic physical structure of a fuel cell consists of an electrolyte layer with a porous anode electrode and porous cathode electrode on opposed sides of the electrolyte. In a typical fuel cell, gaseous fuels, typically hydrogen frequently obtained by the reforming or gasification of higher hydrocarbon fuels, are continuously fed to the anode electrode and an oxidant, typically oxygen from air, is continuously fed to the cathode electrode. The electrochemical reactions take place at the electrodes to produce an electric current.

In a solid oxide fuel cell, the electrolyte is a solid, nonporous metal oxide, normally $Y_2O_3$-stabilized $ZrO_2$ (YSZ), the anode electrode is a metal/YSZ cermet and the cathode electrode is typically Sr-doped $LaMnO_3$. The solid oxide fuel cell operating temperature is typically in the range of about 650° C. to about 1000° C., at which temperature ionic conduction by oxygen ions occurs. Due to the limited amount of power which individual fuel cells are able to produce, individual fuel cells are typically assembled to produce a fuel cell stack comprising a plurality of fuel cells to enable the production of higher power outputs.

Most fuel cells are adversely affected by the presence of sulfur compounds in the fuel gas. While pure hydrogen is the ideal fuel gas for all fuel cell types, its availability is extremely limited. One solution is to convert more readily available and easily transportable hydrocarbon fuels such as natural gas, liquid petroleum gas, alcohols, gasoline and diesel fuel to hydrogen by means of a reforming process. Several reforming technologies to produce hydrogen are known, including autothermal reforming, partial oxidation reforming, plasma reforming, and steam reforming. Reforming of natural gas or other hydrocarbons produces hydrogen-enriched products which, in addition to hydrogen, may also include carbon monoxide, carbon dioxide, and carbon. At the present time, about 90% of the hydrogen produced around the world is from reforming natural gas, as a result of which demand for natural gas is increasing considerably.

Recently, efforts to develop various kinds of fuel reformers to reform liquid or gaseous fuels to produce hydrogen-enriched fuels have increased substantially. Most of these reformers use steam reforming technology, which requires heat and steam. Steam reforming involves the endothermic reaction of hydrocarbon or alcohol fuel with steam to produce carbon monoxide and hydrogen. Steam reformers use high temperature catalyst filled tubes heated by burners fueled by any number of means including fuel cell exhaust fuel and air streams. Steam may be supplied by a waste heat boiler. Heat transferred through the tube walls drives the endothermic reaction.

Generally, heavier liquid hydrocarbons such as diesel fuels and JP-8 are the most difficult to reform due to possible incomplete reforming and the tendency of the reforming process to produce soot rather than the desired product gas. Most of these fuels tend to comprise significant amounts of sulfur which, if allowed to remain in the reformed fuel, may have detrimental effects on the performance of fuel cells. In addition, heavier hydrocarbons which may be present may also have detrimental effects on the performance of the fuel cells.

Several methods are known to those skilled in the art for removing sulfur, and the method employed depends on both the reforming system employed and the type of fuel. If catalytic reforming is employed, sulfur is typically removed from the feedstock prior to reforming. Hydrodesulfurization, in which hydrogen from the product gas stream is reacted with the fuel over a catalyst to convert the sulfur compounds to hydrogen sulfide after which the hydrogen sulfide is removed by passing the stream through a zinc oxide (ZnO) bed, is one well known sulfur removal process for use in connection with liquid hydrocarbons. U.S. Pat. No. 5,686,196 to Singh et al. teaches a system for operation of a solid oxide fuel cell generator on diesel fuel which includes a hydrodesulfurizer which reduces the sulfur content of commercial and military grade diesel fuel in which hydrogen, which has previously been separated from the process stream, is mixed with the diesel fuel at low pressure after which the resulting diesel fuel/hydrogen mixture is pressurized and introduced into the hydrodesulfurizer. The hydrodesulfurizer comprises a metal oxide such as ZnO which reacts with hydrogen sulfide in the presence of a metal catalyst to form a metal sulfide and water. After desulfurization, the diesel fuel is reformed and transferred to a hydrogen separator which removes most of the hydrogen from the reformed fuel prior to introduction into a solid oxide fuel cell generator. The separated hydrogen is then selectively transferred to the diesel fuel/hydrogen mixer or to a hydrogen storage unit.

For desulfurizing natural gas before reforming, activated charcoal filtration is usually all that is required. Non-catalytic partial oxidation reformers are able to tolerate sulfur in the fuel and convert it to hydrogen sulfide which can be removed from the product gas by passing the product gas through a zinc oxide bed. For high temperature fuel cells (temperatures in the range of about 600° C. to about 1000° C.), the reforming process may be carried out at the nickel anode surface using the steam, carbon dioxide, and heat from the power generation reaction.

As an alternative to fuel reforming for producing hydrogen for use in a fuel cell, U.S. Pat. No. 6,653,005 B1 to Muradov teaches a compact hydrogen generator coupled to or integrated with a fuel cell for portable power applications in which hydrogen is produced by thermocatalytic decomposition (cracking, pyrolysis) of hydrocarbon fuels in an oxidant-free environment. The apparatus is indicated to be suitable for use with a variety of hydrocarbon fuels including sulfurous fuels such as natural gas, propane, gasoline, kerosene, diesel fuel, and crude oil. The catalysts for hydrogen production in the apparatus are carbon- or metal-based materials and doped, if necessary, with a sulfur-removing agent.

A significant issue in the operation of high temperature fuel cells is heat management, in particular minimizing the amount of heat loss. Conventional fuel cell power systems for operation of high temperature fuel cell stacks are limited in thermal integration for heat recovery because of the use of discrete heat exchangers, which require extensive ducting and thermal insulation. This approach has made these fuel cell systems both complex and costly to manufacture and tends to place constraints on fuel cell stack design configurations to support the required plumbing system. To address this issue, U.S. Pat. No. 5,612,149 to Hartvigsen et al. teaches a fuel cell module with a fuel cell column having at least one fuel cell stack, mated with the planar wall of a heat exchanger, wherein the fuel cell column and heat exchanger are mounted to a support structure, and which define an air plenum between the fuel cell column and the planar wall of the heat exchanger, thereby eliminating the ductwork and insulation requirements associated with heat exchange systems while increasing the efficiency of the heat exchanger. However, the disclosed design only provides for single stage heating of the oxidant inlet by a single heat exchanger which would not raise the ambient air for the oxidant to the required operating temperature range of the solid oxide fuel cell stack due to the very limited surface and residence time to which the gas would be subjected. In addition, other key requirements such as fuel feedstock preheating prior to reformation, heating needs during system start-up from ambient conditions and partial load operations are also not addressed by this disclosure.

U.S. Pat. No. 4,943,494 to Riley teaches porous refractory ceramic blocks arranged in a stack configuration providing both support and coupling means for a plurality of solid oxide fuel cells. The ceramic blocks and the outer steel shell of the structure provide connections for the air, fuel and process effluent flows. One of the main objects of the disclosed structure is to provide a support structure that integrates fuel, air and effluent flow channels for reduction of interconnection complexities for cost reduction and commercial feasibility. However, the disclosed structure does not provide any means for heat recovery, which is critical for efficient operation and cost effective system operation.

U.S. Pat. No. 5,763,114 to Khandkar et al. teaches a thermally integrated reformer located inside of a furnace structure housing solid oxide fuel cell stacks. In this system, heat from the fuel cell oxidation reaction is recovered to support the endothermic reformation reaction. Heat is recovered by heat transfer to the reformer by radiation from the fuel cell stack and by forced convection from the exhausting airflow exiting the furnace. Although addressing the need for heat recovery and transfer to the fuel feedstock as well as support for the reformation reaction, the heating of the air for the oxidant feedstock is not integrated and is provided by external means resulting in system inefficiency and fabrication complexity. An apparatus for heat recovery is also taught by U.S. Pat. No. 5,906,898 to Pondo, which teaches a fuel cell stack with oxidant flow paths between separator plates and along the outside surface of the fuel cell stack for control of the heat generated by the fuel cells. This patent also teaches direct heating of the oxidant feed gas by using recovered heat from the fuel cell stack by way of heat exchange panels mounted externally on the fuel cell stack, providing oxidant inlet flow paths to the fuel cell stack. However, the highest temperature effluent stream is not fully utilized in this configuration for heat recovery because of its containment inside of the fuel cell stack in the oxidant outlet internal manifold.

U.S. Pat. No. 7,169,495 B2 to Pastula et al. teaches a thermally integrated fuel cell system comprising a fuel cell stack zone which includes one or more fuel cell stacks, a secondary reformer, a radiative heat exchanger, and an equalization heat exchanger, a burner zone which includes an afterburner, a primary reformer, and a high temperature heat exchanger, and a low temperature zone which includes a low temperature heat exchanger and a steam generator. In operation, the fuel is combined with steam and passed sequentially through the primary reformer and the secondary reformer. Air is split into two parallel streams and preheated in the low temperature heat exchanger. One air stream passes through to the high temperature exchanger while the other passes to the radiative heat exchanger. The air and fuel streams are equalized in the equalization heat exchanger before entering the fuel cell stack. The stack exhaust is combusted in the afterburner, the exhaust from which heats the primary reformer, the high temperature heat exchanger, the low temperature heat exchanger, and the steam generator.

Yet another approach to thermal management of a fuel cell and fuel cell system is taught by PCT International Publication No. WO 03/098728 A1. Disclosed therein is a method for thermal management in which a fuel supply stream comprising hydrogen, steam, at least one carbon oxide and optionally methane is processed using a methanator to produce a fuel supply stream comprising a controlled concentration of methane and the fuel cell methane present in the fuel cell supply stream is reformed. The methanator is operated in a manner in which adjustments are made in response to fluctuations in the temperature of the fuel cell such that the concentration of methane in the fuel cell supply stream is controlled to achieve a desired level of reforming of methane within the fuel cell.

SUMMARY OF THE INVENTION

It is one object of this invention to provide a method and system for using sulfur-laden hydrocarbon fuels to fuel fuel cell power systems.

It is one object of this invention to provide a method and system for rendering heavier, sulfur-laden hydrocarbon fuels including JP-8 and diesel fuels suitable for use in fuel cell power systems.

These and other objects of this invention are addressed by a fuel processing system comprising three basic components—a fuel processor in which the sulfur-laden hydrocarbon fuels are reformed using steam reforming, an integrated desulfurization/methanation unit, and a solid oxide fuel cell. The heart of the system is the desulfurization/methanation unit which comprises a first reactor vessel and a second reactor vessel disposed within the first reactor vessel, forming an enclosed reaction space between the first reactor vessel and the second reactor vessel. A methanation catalyst is provided in the enclosed reaction space or the second reactor vessel. A desulfurization material comprising ZnO or another similar sorbent, e.g. $CeO_2$, is provided in the other of the enclosed reaction space and the second reactor vessel. The first and second reactor vessels are arranged such that fluid communication is provided between the methanation catalyst and the desulfurization material. Whichever of the enclosed reaction space and the second reactor vessel contains the desulfurization material is provided with a reformed fuel/steam inlet in fluid communication with a reformed fuel source and whichever of the enclosed reaction space and second reactor vessel contains the methanation catalyst is provided with a methane fuel outlet. During the normal course of operation of the system of this invention, the desulfurization material will reach a saturation point at which it is no longer able to adsorb the sulfur-containing compounds. Contrary to conventional systems in which a fuel containing sulfur is desulfurized prior to methanation in two separate desulfurizer and methanation vessels and the spent desulfurization material is regenerated, the first and second reactor vessels of this invention are separable such that the reactor vessel containing the spent desulfurization material simply can be removed and replaced with a reactor vessel containing fresh desulfurization material.

In the operation of the system of this invention, JP-8 or other heavier hydrocarbon fuels, such as diesel fuels, is mixed with steam and introduced into a steam reformer, producing a mixture of reformed fuel and reformate steam, which mixture may also include other components including BTX, $H_2S$, ethane, propane, liquid petroleum gas, and the like. The mixture is passed through a heat exchanger in which heat in the mixture is transferred to an ambient air stream flowing in heat exchange relationship with the mixture through the heat exchanger. The cooler mixture is passed through a reformate steam knock out pot or vessel in which a portion of the reformate steam is condensed. The remaining portion of reformate steam and the reformed fuel are passed through a second heat exchanger and, from there, into the desulfurization/methanation unit. The output stream from the desulfurization/methanation unit comprises methane and steam, which is passed through the second heat exchanger in heat exchange relationship with the mixture of reformate steam and reformed fuel flowing to the desulfurization/methanation unit. After being cooled in the second heat exchanger, the mixture of methane and steam is introduced into the solid oxide fuel cell stack in which the methane is internally reformed to hydrogen and carbon monoxide. The hydrogen is consumed by the fuel cell to generate power and the anode exhaust gas, containing unused hydrogen and carbon monoxide, is passed through a third heat exchanger in which it is in heat exchange relationship with ambient air for preheating to be provided to the cathode side of the solid oxide fuel cell. The cooler anode exhaust gas is combusted in a combustor, producing combustion products which are passed through a fourth heat exchanger in heat exchange relationship with water from the reformate steam knock out pot, producing steam which is mixed with reformer fuel for introduction into the fuel processor. In accordance with one embodiment, the reformer fuel is mixed with the water from the reformate steam knock out pot prior to introduction of the water into the fourth heat exchanger.

In this approach to heat management, about 95% of the excess fuel cell stack heat is removed, proportioned approximately 55% cell cooling from preheating the incoming cathode air via radiation air preheating and 45% cell cooling from direct internal reforming. This combined approach to stack cooling simplifies the overall system, increases compactness, reduces parasitic losses from air handling, eliminates additional or external heat exchangers, and consequently increases the electrical conversion efficiency. The cathode airflow is projected to be only about 70% higher than that required to satisfy the electrochemical reaction compared to more than 500% higher airflow in designs not incorporating radiation air preheatingt and direct internal reforming, so-called direct cathode cooling. The lower cathode air flow rate also reduces the air pressure drop in the stack, hence lower parasitic blower power, and it also reduces the seal stresses and lowers other mechanical stresses. Lower cell and stack temperature differentials are another beneficial result.

In the operation of the desulfurization/methanation unit, the sulfur-laden reformed gas stream is introduced into and flows through whichever of the reaction space and the second reactor vessel contains the desulfurization material, resulting in desulfurization of the stream, after which the desulfurized stream flows through whichever of the reaction space and the second reactor vessel contains the methanation catalyst. The first and second reactor vessels are arranged such that the gas streams flowing therethrough are in a counterflow relationship. As a result, heat from the exothermic methanation process is transferable to the desulfurization material and sulfur-laden gaseous stream, enabling temperature control over the desulfurization process and the methanation process to match the requirements of the fuel cell into which the methane-containing gaseous stream output from the methanation process is ultimately introduced. The methane introduced into the solid oxide fuel cell is internally reformed in the solid oxide fuel cell and consumes a significant portion of the heat generated, thereby reducing the amount of cathode oxidant flow through the fuel cell needed for sensible cooling, reducing the oxidant-side pressure drop, and reducing the parasitic power required for the oxidant blower.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Definitions

As used herein, the term "fuel/steam" refers to a mixture of fuel and steam. As used herein, the term "reformed fuel/ reformate steam" refers to a mixture of reformed fuel and reformate steam. Reformate steam is the steam which is output together with the reformed fuel from the fuel processor. As used herein, the term "high temperature fuel cell(s)" refers to fuel cells having an operating temperature substantially equal to or greater than about 600° C.

Figure 1:
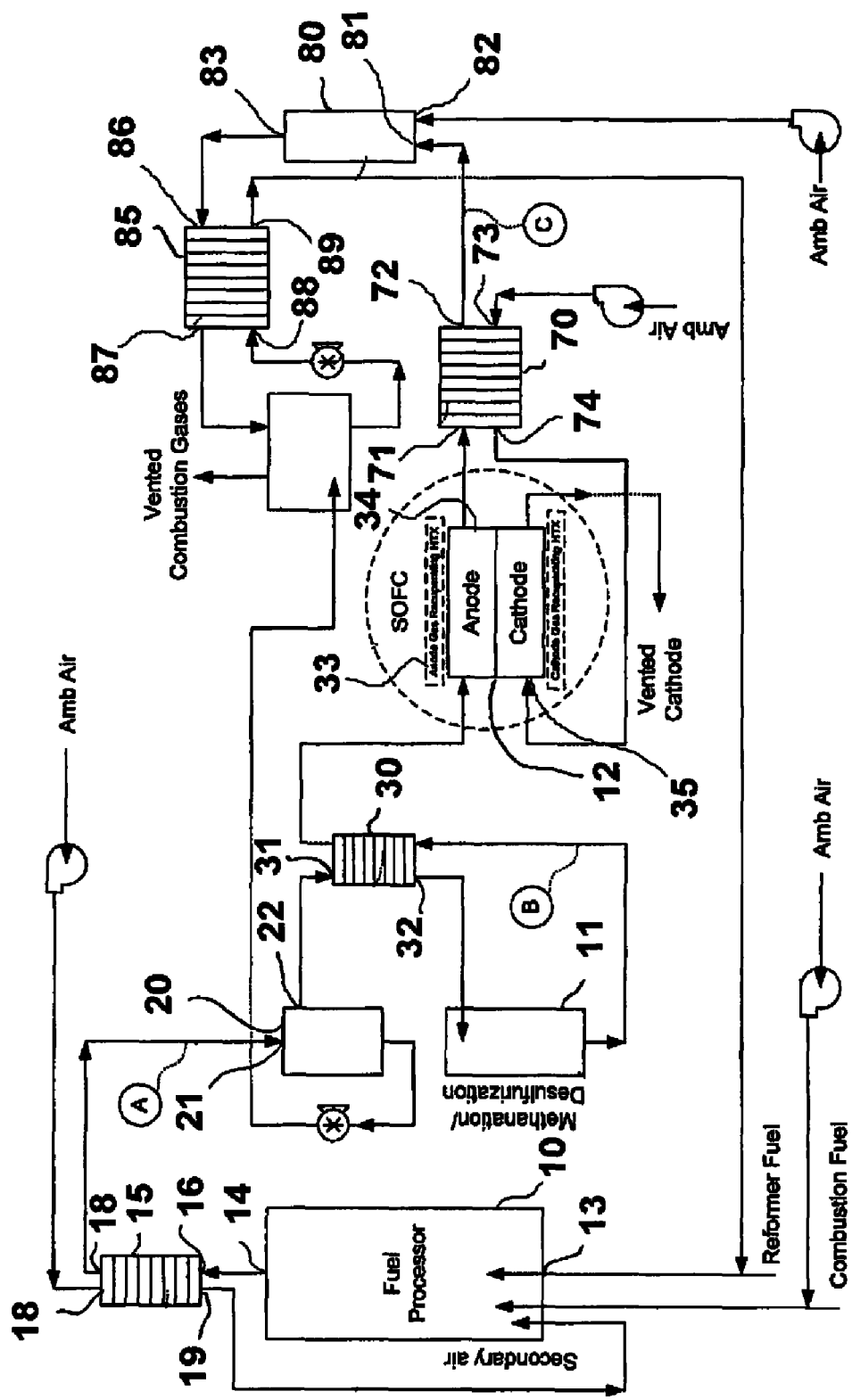
FIG. 1 is a schematic diagram of a solid oxide fuel cell thermally integrated fuel processor system in accordance with one embodiment of this invention.

FIG. 1 is a schematic diagram of the fuel processing system for processing heavier hydrocarbon fuels, such as JP-8, Jet-A, and diesel fuels, to render them suitable for use in solid oxide fuel cells in accordance with one embodiment of this invention. Also represented by FIG. 1 is a flow diagram of the process employed by the system in accordance with one embodiment of this invention. As shown in FIG. 1, the fuel processor system comprises three basic components—fuel processor 10, desulfurization/methanation unit 11, and solid oxide fuel cell 12. Fuel processor 10, having reformer fuel/steam inlet 13 and reformed fuel/reformate steam outlet 14, is used to convert the heavier hydrocarbon fuels into a gaseous product stream, also referred to herein as a reformate gas stream, comprising hydrogen, carbon monoxide, steam or water vapor, carbon dioxide, methane, and, to a lesser extent BTX (benzene, toluene, xylene), hydrogen sulfide, and carbonyl sulfide. Desulfurization/methanation unit 11 is used first to desulfurize the reformate gas stream and second to methanate the reformate gas stream. As an added benefit, BTX in the reformate gas stream is thermally decomposed in the desulfurization/methanation unit. The solid oxide fuel cell 12 is used to internally reform the methane from the desulfurization/methanation unit and generate power. Solid oxide fuel cells and fuel cell stacks capable of internal reforming of higher hydrocarbon fuels and alcohols to produce hydrogen are well known in the art and, thus, will not be described in detail herein.

Figure 3:
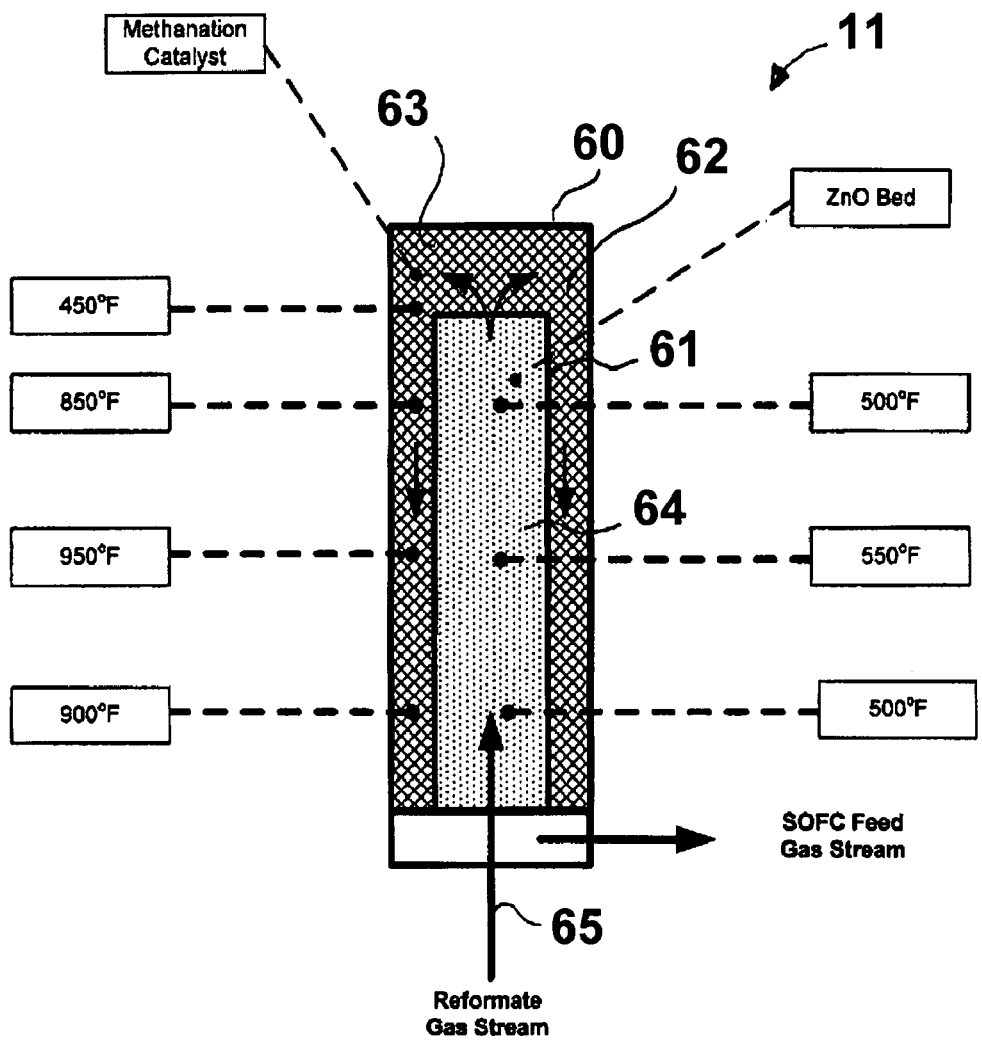
FIG. 3 is a schematic diagram of a desulfurization and methanation unit in accordance with one embodiment of this invention.

Referring to FIGS. 1 and 3, desulfurization/methanation unit 11, shown in FIG. 3, comprises first reactor vessel 60 and second reactor vessel 61 disposed within first reactor vessel 60, forming reaction space 62 between the first and second reactor vessels. In the embodiment shown in FIG. 3, disposed within reaction space 62 is a methanation catalyst 63 and disposed within second reactor vessel 61 is a ZnO bed 64. It will be appreciated by those skilled in the art that the locations of the methanation catalyst and the ZnO bed are interchangeable such that the methanation catalyst may be disposed within second reactor vessel 61 and the ZnO bed may be disposed within reaction space 62.

As shown in FIG. 3, there is provided fluid communication between the methanation catalyst and the ZnO bed. The ZnO bed receives reformed fuel/reformate steam from fuel processor 10, which is enabled by fluid communication between the ZnO bed 64 and reformed fuel/reformate steam outlet 14 of fuel processor 10. Interposed on a process flow basis between fuel processor 10 and desulfurization/methanation unit 11 in accordance with one embodiment of this invention is reformate heat exchanger 15 having a heated reformed fuel/reformate steam inlet 16 in fluid communication with reformed fuel/reformate steam outlet 14 of fuel processor 10 and having a cooled reformed fuel/reformate steam outlet 17 in fluid communication with ZnO bed 64. Reformate heat exchanger 15 further includes ambient secondary air inlet 18 and heated secondary air outlet 19 whereby secondary air flowing through reformate heat exchanger 15 is in heat exchange relationship with the reformed fuel/reformate steam flowing through the heat exchanger, resulting in preheating of the secondary air and cooling of the reformed fuel/reformate steam. Interposed on a process flow basis between reformate heat exchanger 15 and desulfurization/methanation unit 11 is reformate steam knock out pot or vessel 20 in accordance with one embodiment of this invention having cooled reformed fuel/reformate steam inlet 21 in fluid communication with cooled reformed fuel/reformate steam outlet 17 of reformate heat exchanger 15 in which a portion of the reformate steam is condensed to water. The mixture of reformed fuel and remaining reformate steam is conveyed through knock out reformed fuel/reformate steam outlet 22 to reformed fuel/reformate steam heat exchanger 30 having reformed fuel/reformate steam heat exchange inlet 31 and cooled reformed fuel/reformate steam heat exchanger outlet 32, the latter of which is in fluid communication with the ZnO bed of the desulfurization/methanation unit.

As previously indicated, desulfurization/methanation unit 11 (FIG. 3) comprises two reactor vessels, a methanator and a desulfurizer, one inside the other. In accordance with one preferred embodiment of this invention, the desulfurizer is disposed in the methanator with the reformate gas stream entering through the bottom of the desulfurizer as indicated by arrow 65. The reformate gas stream is preheated in reformed fuel/reformate steam heat exchanger 30 to maintain a reformate gas stream inlet temperature to the desulfdization bed in the desulfurizer of about 350° F. Counter flow of the reformate gas stream in the desulfurization bed and the methanation catalyst in the methanator creates a passive heat exchange between the desulfurization bed and the methanation catalyst. The desulfurization bed temperature increases from heat provided by the exothermic methanation reaction in the methanator as shown in FIG. 3. The methanation catalyst heat is adsorbed by the incoming lower temperature reformate gas stream. The desulfurization/methanation unit configuration is such as to enhance the ZnO sulfur capture by means of reaction rates and equilibrium values. As the reformate gas stream continues upward through the ZnO bed, the temperature increases which, in turn, increases the rate of sulfur capture. The temperature across the bed is maintained until proximate the exit of the desulfurizer of the desulfurization/methanation unit, at which point the temperature begins to decline.

The desulfurizer is designed to maximize $H_2S$ reduction by passive control of the steam content, temperature profile and $H_2S$ equilibrium properties within the unit. Prior to exiting the desulfurizer, the reformate gas stream temperature decreases. At temperatures lower than 500° F. and less than 50% steam content, $H_2S$ equilibrium falls below 50 ppb (parts per billion). The substantially desulfurized reformate gas stream is then directed to the methanator of the desulfurization/methanation unit. The desulfurization material, which preferably is ZnO, may be in the form of pellets, granules or coated onto substrates such as reticulated foams.

As the substantially desulfurized reformate gas stream exits the desulfurizer, the temperature of the stream is typically over 400° F. In the methanator, the carbon monoxide and hydrogen in the substantially desulfurized reformate gas stream and the methanation catalyst react to form methane gas. As previously indicated, this is an exothermic reaction which provides heat for the entire desulfurization/methanation unit. The exothermic reaction increases the methanation catalyst temperature to a point where carbon monoxide conversion approaches 100% and where equilibrium prevents further reduction in carbon monoxide. Carbon dioxide methanation is a secondary reaction which also occurs in the methanator. However, this reaction does not take place if the steam content of the substantially desulfurized reformate gas stream is above about 20% by volume. If higher methane concentrations are desired for heat management of the solid oxide fuel cell stack, steam content may be reduced to below about 20% by volume of the substantially desulfurized reformate gas stream. The methane content of the methanated reformate gas stream may be varied between 10% to 40% by volume.

During the methanation process, BTX components, naphthalene and other similar hydrocarbons not processed in the fuel processor crack to form methane, ethane(s), and/or propane(s) gases without forming carbon and without deactivation of the methanation catalyst. Catalysts for the methanation reaction, which is well known, include Ni, Pt, Pd, Ru, or Rh, all of which are commercially available. All provide qualities to maintain reactivity during the exothermic methanation reaction.

After methanation, the methanated reformate gas stream comprising methane and steam from desulfurization/methanation unit 11 flows through reformed fuel/reformate steam heat exchanger 30 in heat exchange relationship with the reformed fuel/reformate steam from reformate steam knock out pot 20. The cooler methanated reformate gas stream is introduced into the solid oxide fuel cell 33 in which the methane in the stream is reformed to produce hydrogen, which, in turn, is reacted at the anode electrode 34 of the fuel cell, generating power and an anode exhaust gas comprising unburned fuel and steam. The anode exhaust gas is introduced into a spent anode gas heat exchanger 70 having an anode exhaust gas inlet 71, a cooled anode exhaust gas outlet 72, an ambient cathode air inlet 73, and a heated cathode air outlet 74 through which it passes in heat exchange relationship with ambient cathode air or oxidant flowing through the heat exchanger, preheating the oxidant prior to its introduction to the cathode electrode 35 of the fuel cell. The cooled spent anode gases are introduced into a spent anode gas combustion unit 80 having spent anode exhaust gas inlet 81, ambient air inlet 82, and combustion products outlet 83 in which it is combusted to produce spent anode gas combustion products. The combustion products are introduced into spent anode combustion gas heat exchanger 85 having combustion products inlet 86, cooled combustion products outlet 87, knock out pot water inlet 88, and steam outlet 89 in which heat from the combustion products is transferred to water from reformate steam knock out pot 20 and water from the combustion products to produce steam. The steam is then mixed with the reformer fuel and the reformer fuel/steam is then introduced into the fuel processor.

Reforming of JP8 is achieved with a steam/carbon ratio of about 4 (3.9 to 4.2) with the reactant water being provided by recycle of the spent anode gas from the solid oxide fuel cell and from the primary condensing heat exchanger prior to the desulfurization/methanation unit. In this way, the need for an external water supply during steady state operations is eliminated.

The fuel processor in accordance with one embodiment of this invention comprises an annular reformer, ceramic porous burners, vaporization coil, and associated ceramic porous plates for flue gas distribution. As shown in detail in FIG. 2, the fuel processor 10 comprises an insulated housing 92 having a flue gas exhaust gas end 96 and a secondary combustion air inlet end 97 and enclosing vaporizer section 90 proximate the flue gas exhaust end and enclosing steam reforming section 91 proximate the secondary combustion air inlet end. Vaporizer section 90 comprises a combustion chamber 101 in which are disposed radiant burner 93 and vaporizer tube 94 in which the fuel to be reformed and water, having been mixed prior to introduction into the vaporizer tube are heated to produce reformer fuel/steam. Steam reforming section 91, separated from vaporizer section 90 by porous reticulated ceramic wall 102, comprises annular reformer 99 disposed around combustion chamber 100 in which are disposed radiant burners 95. Flue gas exhaust end 96 and secondary combustion air inlet end 97 of the fuel processor are closed off by porous reticulated ceramic walls 103 and 104, respectively. By virtue of this arrangement, secondary combustion air to radiant burners 95 in combustion chamber 100 flow through porous reticulated ceramic wall 104 into combustion chamber 100, combustion products generated in combustion chamber 100 flow through porous reticulated ceramic wall 102 into combustion chamber 101 and, after combining with the combustion products generated in combustion chamber 101, are exhausted from the fuel processor through porous reticulated ceramic wall 103. The configuration of the fuel processor ensures that the reforming catalyst in the reforming section may always be maintained at a temperature above about 1300° F. By maintaining the temperature at this level, any heavier hydrocarbons remaining in the reformate gas stream, such as BTX or naphthalene may be reformed.

The radiant burners are preferably fueled with JP-8 fuel and are custom configured from porous reticulated ceramics in unique geometries and surrounded by cylindrical reticulated ceramics. This provides a large porous radiant surface to complete fuel vaporization and combustion. Uniform radiant heat is generated for the steam reforming reactor while completely burning the liquid JP8 fuel stream. The porous reticulated ceramics may be made of silicon carbide (silicon nitride or other high-temperature ceramics) with 20-80 pores-per-inch (PPI).

The steam reforming catalyst in accordance with one embodiment of this invention is a sulfur tolerant precious metal on a ceria-doped zirconia support (or a molybdenum sulfide on a ceria-doped zirconia support) to facilitate elimination of an upstream fuel pre-treatment step. Steam reforming catalysts for low pressure drop operation are preferably in the form of pellets, granules, particles, or micron fiber encapsulated catalyst particles, or are supported on reticulated foam ceramic or metal foams. Heat flow pattern is counter to reforming heat duty. The reformer temperature typically operates in the range of 1300° F. to 1700° F. The annular design of this reformer enables operation at pressures in the range of about atmospheric to about 10 psig.

EXAMPLE

Figure 2:
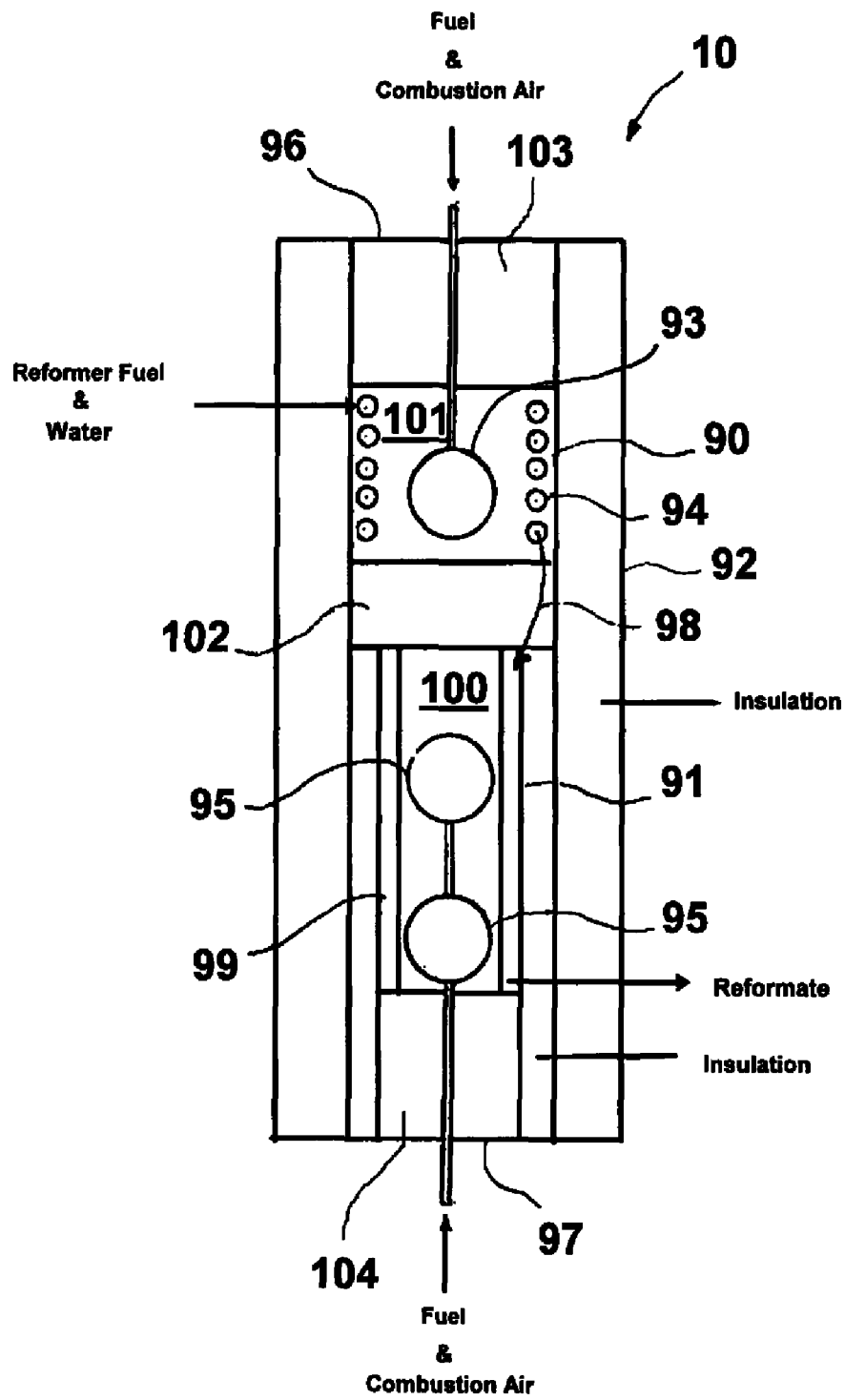
FIG. 2 is a schematic diagram of a JP-8 fuel processor in accordance with one embodiment of this invention.

A 3-kW solid oxide fuel cell stack was operated on fuel gas generated using the fuel processor shown in FIG. 2 in which the reformer fuel or feed gas was JP-8 fuel with about 600 ppmw to 800 ppmw sulfur. The feedstock was filtered only with a standard 10 ul paper filter. No further pre-processing is considered to be required, i.e. no fractionation or liquid phase desulfurization to separate C6+ hydrocarbons from reformer feedstock. Diesel fuel with 50 ppmw or less sulfur or ultra-low sulfur diesel (ULSD) with 10 ppmw or less total sulfur, or sulfur-free "biodiesel" may also be used. The reformate gas stream composition on a dry basis at three different points designated as "A", "B", and "C" in FIG. 1 in the fuel processing process, i.e. at the outlet to the fuel processor, at the outlet to the desulfurization/methanation unit, and in the anode exhaust gas, are shown in Table 1.

TABLE 1

Fuel Gas Compositions for 3 kW Integrated System

| Gas Species | Reformate, % Dry | SOFC Feed Gas, % Dry | SOFC Spent Anode Gas, % Dry |
|---|---|---|---|
| Gas Type | A | B | C |
| $H_2$ | 68.1 | 59.47 | 46.9 |
| $CO_2$ | 19.2 | 24.1 | 45.4 |
| $CH_4$ | 2.9 | 13.6 | 0 |
| CO | 9.5 | 2.83 | 7.7 |
| BTX | 3000 ppm | ~30 ppm | ~30 ppm |
| $H_2S$ & COS | 45 to 80 ppm | ~50 ppb | ~50 ppb |
| Total | 100.0 | 100.0 | 100.0 |

The fuel processor coupled with the desulfurization/methanation unit produced a stream containing about 15-mol % methane plus hydrogen gas. The solid oxide fuel cell stack was operated on the methane reformate gas stream from the desulfurization/methanation unit at a stack inlet steam-to-carbon ratio (S/C) of 2.5. The $H_2S$ concentration in the methane reformate gas stream was below the detection level of 50 ppb. This is sufficiently low to satisfy the sulfur tolerance requirements of 50-100 ppb for the solid oxide fuel cell stack. The stack performance results indicate that at a typical current density of 400 $mA/cm^2$ the power output of the stack is about 3107 watts. The results also indicate that the power output obtained for the JP-8 reformate fuel is comparable to that obtained with a pure hydrogen baseline case. Continuous gas chromatography (GC) sampling of the fuel outlet was conducted to monitor the reforming of JP-8 reformate into $H_2$, CO, and $CO_2$. Inside the solid oxide fuel cell stack, sampling indicated 100% reforming of the methane under loaded power production conditions during the testing.

While in the foregoing specification this invention has been described in relation to certain preferred embodiments thereof, and many of the details have been set forth for purposes of illustration, it will be apparent to those skilled in the art that the invention is susceptible to additional embodiments and that certain of the details described herein can be varied considerably without departing from the basic principles of the invention.

We claim:

1. A fuel processing system comprising:
a first reactor vessel;
a second reactor vessel disposed within said first reactor vessel and forming an enclosed reaction space between said first reactor vessel and said second reactor vessel;
a methanation catalyst disposed in one of said enclosed reaction space and said second reactor vessel;
a desulfurization material disposed in the other of said enclosed reaction space and said second reactor vessel, said methanation catalyst and said desulfurization material in fluid communication with each other;
said one of said enclosed reaction space and said second reactor vessel containing said desulfurization material having a reformed fuel/steam inlet in fluid communication with a reformed fuel source; and
said one of said enclosed reaction space and said second reactor vessel containing said methanation catalyst having a methane fuel outlet.

2. A system in accordance with claim 1, wherein said desulfurization material comprises at least one of ZnO and $CeO_2$.

3. A system in accordance with claim 1, wherein said first reactor vessel and said second reactor vessel are separable from each other.

4. A system in accordance with claim 1, wherein said desulfurization material is in fluid communication with a steam source.

5. A system in accordance with claim 4, wherein said steam source is a heat exchanger having a heat exchanger reformed fuel/steam inlet in fluid communication with said reformed fuel source and having a heat exchanger reformed fuel/steam outlet in fluid communication with said desulfurization material.

6. A system in accordance with claim 5, wherein said heat exchanger has a methane fuel inlet in fluid communication with said methane fuel outlet, and a reduced temperature methane fuel outlet.

7. A system in accordance with claim 6 further comprising at least one solid oxide fuel cell having a reduced temperature methane fuel inlet in fluid communication with said reduced temperature methane fuel outlet.

8. A system in accordance with claim 7, wherein said at least one solid oxide fuel cell comprises direct internal reforming means for internally reforming methane in fluid communication with said reduced temperature methane inlet.

9. A system in accordance with claim 8 further comprising an anode exhaust gas heat exchanger having a heated anode exhaust gas inlet in fluid communication with an anode exhaust gas outlet of said solid oxide fuel cell, having an oxidant gas inlet, having a heated oxidant gas outlet in fluid communication with a heated oxidant gas inlet of said solid oxide fuel cell, and having a cooled anode exhaust gas outlet in fluid communication with a combustor having a cooled anode exhaust gas inlet and a combustion exhaust gas outlet.

10. A system in accordance with claim 9, wherein said reformed fuel source is a steam reformer having a reformer fuel inlet, a reformer steam inlet and a reformed fuel/reformate steam outlet.

11. A system in accordance with claim 10 further comprising a combustion exhaust gas heat exchanger having a heated combustion exhaust gas inlet in fluid communication with said combustion exhaust gas outlet, having a cooled combustion exhaust gas outlet, having a water inlet, and having a reformer steam outlet in fluid communication with said reformer steam inlet.

12. A system in accordance with claim 11 further comprising a reformate steam knock out vessel having a reformed fuel/reformate steam inlet in fluid communication with said reformed fuel/reformate steam outlet, having a water outlet in fluid communication with said water inlet, and having a cooled reformed fuel/reformate steam outlet in fluid communication with said fuel/steam mixture inlet of said heat exchanger.

13. A system in accordance with claim 12 further comprising a reformed fuel heat exchanger having a reformed fuel/steam inlet in fluid communication with said reformed fuel/reformate steam outlet, having a secondary reformer oxidant inlet, having a heated secondary oxidant outlet in fluid communication with said steam reformer, and having a cooled reformed fuel/steam outlet in fluid communication with said reformed fuel/reformate steam inlet.

* * * * *